United States Patent
Lin

(10) Patent No.: US 11,012,359 B2
(45) Date of Patent: May 18, 2021

(54) METHOD AND SYSTEM FOR REDIRECTING SERVICE APPLICATION TRAFFIC

(71) Applicant: WANGSU SCIENCE & TECHNOLOGY CO., LTD., Shanghai (CN)

(72) Inventor: Yuanming Lin, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 79 days.

(21) Appl. No.: 16/330,510

(22) PCT Filed: Aug. 1, 2017

(86) PCT No.: PCT/CN2017/095533
§ 371 (c)(1),
(2) Date: Mar. 5, 2019

(87) PCT Pub. No.: WO2019/010734
PCT Pub. Date: Jan. 17, 2019

(65) Prior Publication Data
US 2019/0199635 A1    Jun. 27, 2019

(30) Foreign Application Priority Data

Jul. 12, 2017    (CN) .......................... 201710566131.X

(51) Int. Cl.
*H04L 12/803*    (2013.01)
*H04L 29/08*    (2006.01)
(Continued)

(52) U.S. Cl.
CPC .......... *H04L 47/122* (2013.01); *H04L 47/193* (2013.01); *H04L 47/20* (2013.01);
(Continued)

(58) Field of Classification Search
CPC ....... H04L 47/122; H04L 67/28; H04L 47/20; H04L 67/2814; H04L 47/193;
(Continued)

(56) References Cited

U.S. PATENT DOCUMENTS

2006/0056379 A1* 3/2006 Battin .................... H04W 76/12
370/349
2014/0351047 A1* 11/2014 Li ....................... G06Q 30/0255
705/14.53

(Continued)

FOREIGN PATENT DOCUMENTS

CN    103916405 A    7/2014
CN    103944906 A    7/2014
(Continued)

OTHER PUBLICATIONS

The World Intellectual Property Organization (WIPO) International Search Report for PCT/CN2017/095533 dated Mar. 28, 2018 5 Pages.

(Continued)

*Primary Examiner* — Kwang B Yao
*Assistant Examiner* — Syed M Bokhari
(74) *Attorney, Agent, or Firm* — Anova Law Group, PLLC

(57) ABSTRACT

The present disclosure provides a method and a system for redirecting service application traffic. The method includes: traversing dlopen function and connect function in all dynamic libraries initially loaded by a service application module; mounting the dlopen function and the connect function, and replacing the dlopen function and the connect function with a self-defined mydlopen function and a self-defined myconnect function, respectively. Features of the mydlopen function include loading a new dynamic library, mounting the dlopen function and the connect function in (Continued)

the new dynamic library, and replacing the dlopen function and the connect function with the mydlopen function and the myconnect function, respectively. Features of the myconnect function include redirecting non-local traffic of the service application module to a proxy service module, receiving, by the proxy service module, the non-local traffic, and redirecting, by the proxy service module, the non-local traffic.

14 Claims, 2 Drawing Sheets

(51) Int. Cl.
*H04W 28/14* (2009.01)
*H04L 12/801* (2013.01)
*H04L 29/06* (2006.01)
*H04W 28/10* (2009.01)
*H04L 12/813* (2013.01)

(52) U.S. Cl.
CPC .......... *H04L 63/0884* (2013.01); *H04L 67/28* (2013.01); *H04L 67/2814* (2013.01); *H04L 67/327* (2013.01); *H04W 28/10* (2013.01); *H04W 28/14* (2013.01)

(58) Field of Classification Search
CPC ... H04L 63/0884; H04L 67/327; H04L 45/74; H04L 69/161; H04W 28/10; H04W 28/14
USPC .................................................. 370/229, 349
See application file for complete search history.

(56) References Cited

U.S. PATENT DOCUMENTS

| | | | |
|---|---|---|---|
| 2015/0339137 | A1* | 11/2015 | Andrus ................. G06F 9/4552 717/148 |
| 2016/0373546 | A1* | 12/2016 | Lotfallah ................ H04L 67/02 |
| 2019/0213032 | A1* | 7/2019 | Eyal ........................... G06F 9/50 |

FOREIGN PATENT DOCUMENTS

| | | |
|---|---|---|
| CN | 104484259 A | 4/2015 |
| CN | 105898775 A | 8/2016 |
| WO | 2004092905 A2 | 10/2004 |

OTHER PUBLICATIONS

The European Patent Office (EPO) The Extended European Search Report for 17917570.8 dated Oct. 29, 2019 8 Pages.

* cited by examiner

METHOD AND SYSTEM FOR REDIRECTING SERVICE APPLICATION TRAFFIC

CROSS-REFERENCES TO RELATED APPLICATIONS

This application is a national phase entry under 35 U.S.C § 371 of International Application No. PCT/CN2017/095533, filed on Aug. 1, 2017, which claims priority of Chinese Patent Application No. 201710566131.X, filed with the State Intellectual Property Office of P. R. China on Jul. 12, 2017, the entire contents of all of which are incorporated herein by reference.

FIELD OF THE DISCLOSURE

The present disclosure relates to the field of mobile Internet and mobile data and, more particularly, relates to a method and a system for redirecting service application traffic.

BACKGROUND

As the mobile Internet develops rapidly, features of the application programs (i.e., APPs) installed on smart mobile terminals (e.g., cellphone, tablet, PDA, etc.) rely more and more on the Internet. Many functions of a mobile App are made possible only by connecting the App to the Internet, which makes data traffic a topic that attracts wide attention from users of the mobile Internet. For example, many users tend to use a cellphone to browse videos, music, images or articles that they are interested in when being outdoor during their spare time, such as when waiting for a person or taxi, taking public transportation, and during the gap of dish ordering. These operations all result in the consumption of a large amount of data traffic, which places certain financial burden on the users.

To solve the aforementioned issues, some have proposed the concept of "directional data flow". That is, some content providers (CP) collaborate with certain mobile operators to offer discounts (e.g., fifty percentage off or entire fee waiver) on the fee associated with data generated when users access content provided by these CPs through designated mobile Apps. By using the mobile Apps (e.g., mobile video app) that support "directional data flow", the users may browse the content (e.g., movies, dramas, shows) provided therefrom freely, without worrying about the data issue.

In the conventional Apps that support directional data flow, a CP may realize the directional data flow by reporting domain names. Specifically, a mobile operator may waive the charge for communications generated by its subscribers when accessing certain addresses. However, during actual implementations, if the CP corresponds to several operators, the CP needs to match the interface of each carrier and to establish different traffic scheduling strategies based on different subscriptions. This leads to the issue of inconsistency in service access approaches, which makes it relatively difficult to realize platform connection. Further, because there are different operators and the cellphone of the user has no uniform acquisition interface, the issue of a relatively low success rate in number-fetching may even exist. These issues together lead to the on-and-off phenomenon in traffic redirecting under "directional data flow", which further affects the user's experience seriously.

BRIEF SUMMARY OF THE DISCLOSURE

To solve issues in existing technologies, embodiments of the present disclosure provide a method and a system for redirecting service application traffic. The technical solutions are as follows.

In one aspect, a method for redirecting a service application traffic is provided, where the method includes:
traversing dlopen function and connect function in all dynamic libraries initially loaded by a service application module;
mounting the dlopen function and the connect function, and replacing the dlopen function and the connect function with a self-defined mydlopen function and a self-defined myconnect function, respectively; where features of the mydlopen function include loading a new dynamic library, mounting the dlopen function and the connect function in the new dynamic library, and replacing the dlopen function and the connect function with the mydlopen function and the myconnect function, respectively; features of the myconnect function include redirecting non-local traffic of the service application module to a proxy service module; and
receiving, by the proxy service module, the non-local traffic, and redirecting, by the proxy service module, the non-local traffic.

Further, the features of the myconnect function include receiving traffic sent by the service application module, acquiring a destination IP address and a destination port of the traffic, and determining whether the destination IP address is a local IP address. If the destination IP address is a local IP address, the myconnect function sends the traffic to the destination port, and if the destination IP address is not the local IP address, the myconnect function sends the traffic to a port listened on by the proxy service module.

Further, the features of the myconnect function include establishing a destination IP address, a destination port, and a connection port for acquiring the non-local traffic, and establishing and saving a mapping relationship between the destination IP address, the destination port and the connection port into a mapping relationship record.

Further, a method of redirecting, by the proxy service module, the non-local traffic includes:
acquiring a traffic redirecting rule; and
based on the traffic redirecting rule, sending the non-local traffic back to a source station; or establishing a transmission path connecting the proxy service module, a redirecting node, and a source server, and sending the non-local traffic to the source server through the transmission path; after acquiring a corresponding resource, sending the resource back to the proxy service module through the transmission path, and sending, by the proxy service module, the resource to the service application module.

Further, the acquiring the traffic redirecting rule includes:
when starting the proxy service module, loading the traffic redirecting rule from a cache, and if the traffic redirecting rule cannot be loaded from the cache, applying a default traffic redirecting rule; and
issuing, by an authorization server, the corresponding traffic redirecting rule to the proxy service module based on user information, and receiving, by the proxy service module, the traffic redirecting rule issued by the authorization server.

Further, sending the non-local traffic back to the source station includes: acquiring a destination IP and a destination port of the non-local traffic from the mapping relationship record, and sending the non-local traffic to a source server corresponding to the destination IP and the destination port.

Further, a method of establishing the transmission path connecting the proxy service module, the redirecting node, and the source server includes:

sending, by the proxy service module, a connection request to a redirecting node designated in the traffic redirecting rule; and after establishing a successful connection, sending a packet that includes information of the destination IP and the destination port of the non-local traffic to the redirecting node, parsing, by the redirecting node, the destination IP and the destination port from the packet, selecting, by the redirecting node, a source server for establishing a connection, and after connection is established, sending, by the proxy service module, the non-local traffic to the redirecting node through the transmission path, such that the non-local traffic arrives at the source server to acquire the requested resource.

Further, the packet includes a verification value, where the redirecting of the node confirms whether a current connection is legal based on the verification value. If the current connection is legal, the redirecting node selects the source server and connects with the server.

Further, a method of sending, by the proxy service module, the resource to the service application module includes: after receiving the resource, acquiring, by the proxy service module, a connection port of the service application module based on the mapping relationship record, and sending, by the proxy service module, the resource to the connection port.

Further, the source servers include a content server and a cache server.

Further, the service application traffic is TCP traffic.

In another aspect, a system for redirecting service application traffic is provided, where the redirecting system includes:

a service application module, a function configuration module, and a proxy service module installed and running at a same electronic device. The function configuration module traverses dlopen function and connect function in all dynamic libraries initially loaded by a service application module, mounts the dlopen function and the connect function, and replaces the dlopen function and the connect function with a self-defined mydlopen function and a self-defined myconnect function, respectively. Features of the mydlopen function include loading a new dynamic library, mounting the dlopen function and the connect function in the new dynamic library, and replacing the dlopen function and the connect function with the mydlopen function and the myconnect function, respectively. Features of the myconnect function include redirecting non-local traffic of the service application module to a proxy service module.

where the proxy service module receives the non-local traffic and directs the non-local traffic.

Further, the features of the myconnect function include receiving traffic sent by the service application module, acquiring a destination IP address and a destination port of the traffic, and determining whether the destination IP address is a local IP address If the destination IP address is a local IP address, the myconnect function sends the traffic to the destination port, and if the destination IP address is not the local IP address, the myconnect function sends the traffic to a port listened on by the proxy service module.

Further, the features of the myconnect function include establishing a destination IP address, a destination port, and a connection port for acquiring the non-local traffic, and establishing and saving a mapping relationship between the destination IP address, the destination port and the connection port into a mapping relationship record.

Further, the redirecting system also includes redirecting nodes and source servers, and a method of redirecting, by the proxy service module, the non-local traffic includes:

acquiring a traffic redirecting rule; and based on the traffic redirecting rule, sending the non-local traffic back to a source station; or establishing a transmission path connecting the proxy service module, a redirecting node, and a source server, and sending the non-local traffic to the source server through the transmission path; after acquiring a corresponding resource, sending the resource back to the proxy service module through the transmission path, and sending, by the proxy service module, the resource to the service application module.

Further, the redirecting system further includes an authorization server, and acquiring, by the proxy service module, the traffic redirecting rule includes:

when starting the proxy service module, loading the traffic redirecting rule from a cache, and if the traffic redirecting rule cannot be loaded from the cache, applying a default traffic redirecting rule; and issuing, by an authorization server, the corresponding traffic redirecting rule to the proxy service module based on user information, and receiving, by the proxy service module, the traffic redirecting rule issued by the authorization server.

Further, sending, by the proxy service module, the non-local traffic back to the source station includes: acquiring a destination IP and a destination port of the non-local traffic from the mapping relationship record, and sending the non-local traffic to a source server corresponding to the destination IP and the destination port.

Further, a method of establishing a transmission path connecting the proxy service module, the redirecting node, and the source server includes:

sending, by the proxy service module, a connection request to a redirecting node designated in the traffic redirecting rule; and after establishing a successful connection, sending a packet that includes information of the destination IP and the destination port of the non-local traffic to the redirecting node, parsing, by the redirecting node, the destination IP and the destination port from the packet, selecting, by the redirecting node, a source server for establishing a connection, and after connection is established, sending, by the proxy service module, the non-local traffic to the redirecting node through the transmission path, such that the non-local traffic arrives at the source server to acquire the requested resource.

Further, the packet includes a verification value, where the redirecting of the node confirms whether a current connection is legal based on the verification value. If the current connection is legal, the redirecting node selects the source server and connects with the server.

Further, a method of sending, by the proxy service module, the resource to the service application module includes: after receiving the resource, acquiring, by the proxy service module, a connection port of the service application module based on the mapping relationship record, and sending, by the proxy service module, the resource to the connection port.

Further, the source server includes a content server and a cache server.

Further, the service application traffic is TCP traffic.

Further, the proxy service module and the function configuration module are software development tool packets embedded in the service application module.

Further, the electronic device may be a mobile communication device.

Beneficial effects brought about by the technical solutions provided by the present disclosure include: solving the issue of traffic redirecting by a local proxy and an approach of function replacement, which greatly enhances the smoothness degree of traffic redirecting in the directional data flow, such that the user can have a relatively good experience. Further, by authorizing user information, different traffic redirecting rules are issued to different users, thereby satisfying service requirements.

BRIEF DESCRIPTION OF THE DRAWINGS

To more clearly illustrate technical solutions of the present disclosure, accompanying drawings used in descriptions of embodiments hereinbelow are introduced briefly. Obviously, the accompanying drawings described hereinafter are only some embodiments of the present disclosure, and for those ordinarily skilled in the relevant art, other drawings may be obtained from these accompanying drawings without creative labor.

DETAILED DESCRIPTION

To make the objective, technical solutions and advantages of the present disclosure clearer, embodiments of the present disclosure are described in more details with reference to the accompanying drawings. It should be understood that, the specific embodiments described herein are merely applied to illustrate the present disclosure, but not intended to limit the present disclosure.

Embodiments of the present disclosure describe a method and a system for redirecting service application traffic. The mobile apps involved in the present disclosure include but are not limited to: mobile apps that run on mobile platforms such as the Android operating system developed by Google LLC., the IOS operating system developed by Apple INC., the Windows Phone operating system developed by Microsoft, and the Symbian operating system developed by Nokia. It should be noted that the mobile platforms are for illustrative purposes. The present disclosure is not intended to limit the apps that run on the aforementioned platforms, and mobile apps running on other mobile platforms not listed above shall also fall within the scope of the present disclosure.

Embodiment 1

A method for redirecting service application traffic provided by Embodiment 1 of the present disclosure is illustrated in detail below.

Figure 1:
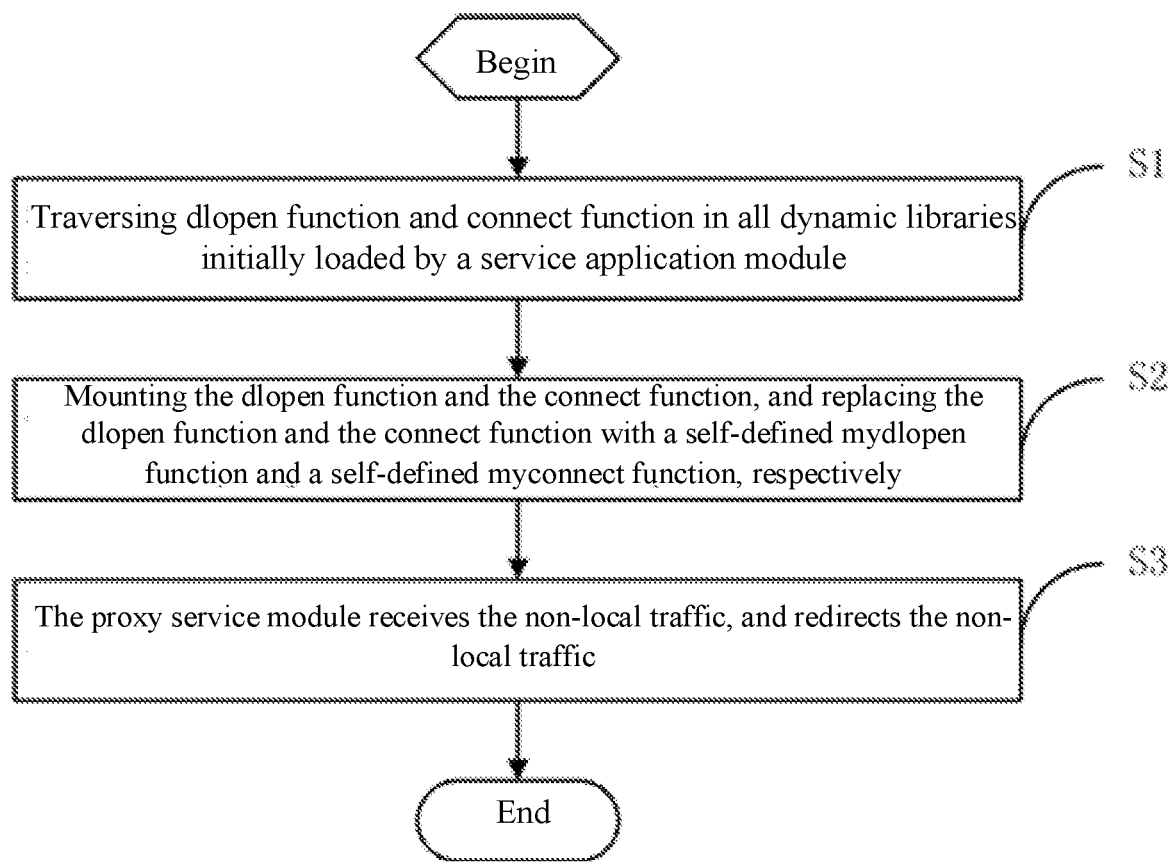
FIG. 1 illustrates a flow chart of a method for redirecting service application traffic according to embodiments of the present disclosure.

Referring to FIG. 1, a flow chart of a method for redirecting service application traffic consistent with embodiments of the present disclosure is illustrated.

At step S1, traversing dlopen function and connect function in all dynamic libraries initially loaded by a service application module.

At step S2, mounting the dlopen function and the connect function, and replacing the dlopen function and the connect function with a self-defined mydlopen function and a self-defined myconnect function, respectively.

In particular, the dlopen function is a strong library function, and common features of this function include opening a new library and storing the new library in a memory.

The connect function is also a common function, primarily configured to establish connections.

The mydlopen function is a self-defined function established for users. Other than maintaining the feature of the dlopen function that loads new dynamic libraries, the mydlopen function introduces features of mounting the dlopen function and the connect function in the new dynamic libraries, and replacing the dlopen function and the connect function with a self-defined mydlopen function and a self-defined myconnect function, respectively. As such, when the service application module loads a new dynamic library through the mydlopen function, the dlopen function and the connect function in the new dynamic library are replaced with the mydlopen function and the myconnect function. Further, through an approach of recursion, the dlopen function and connect function in in all dynamic libraries loaded by the service application module are replaced with the mydlopen function and the myconnect function.

The myconnect function is also a self-defined function established by the users, and the features of the myconnect function include redirecting non-local traffic of the service application module to a proxy service module. Specifically, the features of the myconnect function include receiving traffic sent by the service application module, acquiring a destination IP address and a destination port of the traffic, and determining whether the destination IP address is a local IP address. If the destination IP address is the local IP address, the myconnect function sends the traffic to the destination port, and if the destination IP address is not the local IP address, the myconnect function sends the traffic to a port listened on by the proxy service module.

Further, the functions of myconnect function also include establishing a destination IP address, a destination port, and a connection port for acquiring the non-local traffic, and establishing and saving a mapping relationship between the destination IP address, the destination port, and the connection port into a mapping relationship record. The mapping relationship is primarily used subsequently when data is sent back to the service application module, which will be illustrated in detail hereinafter.

In the disclosed mobile app, when the app is started, the service application module performs initialization by applying an approach of mounting the redirecting service. That is, dlopen function and connect function in all dynamic libraries initially loaded by a service application module of the current mobile app are traversed, and all dlopen function and connect function associated with the dynamic libraries are replaced with a self-defined mydlopen function and a self-defined myconnect function, respectively.

During the use of the mobile app, the mydlopen function is applied to load a desired new dynamic library, and when the new library is loaded, the dlopen function and the connect function in the new library are replaced with the mydlopen function and the myconnect function, respectively. Similarly, when the new dynamic library loads other libraries, the mydlopen function may be triggered, and the mydlopen function may be utilized to determine whether a newly loaded dynamic library includes the dlopen function and the connect function. If the newly loaded dynamic library includes the dlopen function and the connect function, the dlopen function and the connect function in the newly loaded dynamic library are replaced with the mydlopen function and the myconnect function, respectively. As such, through the aforementioned recursive approach, the connect function in all the dynamic libraries loaded by the service application module is replaced with the myconnect function. Further, through the myconnect function, the local traffic is sent to a local device and the non-local traffic is sent to the proxy service module, such that traffic leakage is avoided.

At step S3, the proxy service module receives the non-local traffic, and directs the non-local traffic.

In one implementation, when started, the service application module may request user information from the user. After receiving the user information, the user information may be sent to a remote authorization server, and the remote authorization server determines a subscription state of the user based on the user information and issues a corresponding traffic redirecting rule to the proxy service module. The traffic redirecting rule includes whether or not to perform traffic redirecting, information of designated redirecting nodes, and data encryption key, etc. When the proxy service module receives the issued traffic redirecting rule, the traffic redirecting rule is saved, and traffic redirecting is performed based on the traffic redirecting rule.

Because the process during which the remote authorization server issues the traffic redirecting rule takes a certain period of time, to ensure the user experience, the traffic redirecting rule in the cache is loaded simultaneously when starting the proxy service module. If the traffic redirecting rule cannot be loaded from the cache, a default traffic redirecting rule is applied to direct the current traffic, thereby providing rapid response to the user request.

Figure 2:
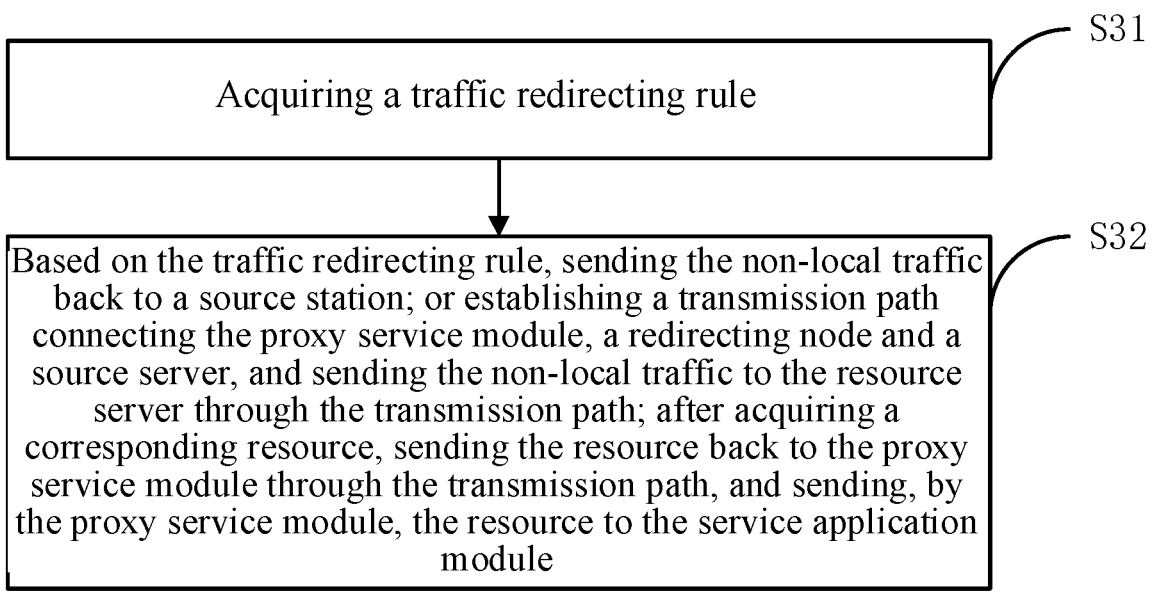
FIG. 2 illustrates a specific flow chart of step S3 in FIG. 1, according to embodiments of the present disclosure.

As shown in FIG. 2, in one implementation, a method of using the proxy service module to direct the non-local traffic includes sub-steps S31-S32.

Referring to FIG. 2, FIG. 2 illustrates a specific flow chart of step S3 in FIG. 1, according to embodiments of the present disclosure.

At step S31, acquiring a traffic redirecting rule.

Based on the aforementioned descriptions, acquiring the traffic redirecting rule includes:

when starting the proxy service module, loading the traffic redirecting rule from a cache, and if the traffic redirecting rule cannot be loaded from the cache, applying a default traffic redirecting rule;

issuing, by an authorization server, the traffic redirecting rule to the proxy service module based on user information, receiving, by the proxy service module, the traffic redirecting rule issued by the authorization server, and loading, by the proxy service module, the traffic redirecting rule for use. That is, when the traffic redirecting rule issued by the authorization server has not arrived at the proxy service module, to rapidly respond to the user request, the proxy service module may first load the traffic redirecting rule in the local cache or process the traffic based on the default traffic redirecting rule. After the proxy service module receives the traffic redirecting rule issued by the authorization server, the proxy service module may process the non-local traffic received from the service application module based on the newly issued traffic redirecting rule.

At step S32, based on the traffic redirecting rule, sending the non-local traffic back to a source station; or establishing a transmission path connecting the proxy service module, a redirecting node and a source server, and sending the non-local traffic to the source server through the transmission path; after acquiring a corresponding resource, sending the resource back to the proxy service module through the transmission path, and sending, by the proxy service module, the resource to the service application module.

In one implementation, sending the non-local traffic back to the source station includes: acquiring a destination IP and a destination port of the non-local traffic from the mapping relationship record, and sending the non-local traffic to a source server corresponding to the destination IP and the destination port.

In one implementation, a method of establishing a transmission path connecting the proxy service module, the redirecting node, and the source server (step S32) includes: sending, by the proxy service module, a connection request to a redirecting node designated in the traffic redirecting rule; after establishing a successful connection, sending a packet that include information of the destination IP and the destination port of the non-local traffic to the redirecting node, parsing, by the redirecting node, the destination IP and the destination port from the packet, selecting, by the redirecting node, a source server for establishing a connection, after connection is established, the transmission path is created. The proxy service module can then send the non-local traffic to the redirecting node through the transmission path, where the non-local traffic arrives at the source server to acquire requested resource.

In one implementation, the packet includes a verification value. When receiving the packet, the redirecting node confirms whether a current connection is legal based on the verification value of the packet. If the current connection is legal, a source server is selected and connected. If the current connection is illegal, the user information is determined to be expired or invalid, connection with the source server is refused, and information of connection failure is sent back to the proxy service module.

In one implementation, a method of sending, by the proxy service module, the resource to the service application module (step S32) includes: after receiving the resource, acquiring, by the proxy service module, a connection port of the service application module that sends the request from the mapping relationship record, and sending, by the proxy service module, the resource to the connection port.

In one implementation, the source server may be a content server, or a caching server in a CDN network.

In one implementation, the service application traffic is TCP traffic.

The present disclosure provides a method for redirecting service application traffic. Traffic of the service application module is directed through a function-replacing approach and local proxy, and a transmission path is established to improve the traffic transmission speed. Further, the user information is verified through a remote authorization server, and based on the subscription state and content of the current user, a corresponding traffic redirecting rule is issued. Thus, the smoothness degree of traffic redirecting in the directional data flow is greatly enhanced, to allow the user to have a relatively good experience. Further, the service demands for service provider to provide difference service experiences to different users are also satisfied.

Embodiment 2

A system for redirecting service application traffic is illustrated in detail hereinafter according to embodiments of the present disclosure.

Figure 3:
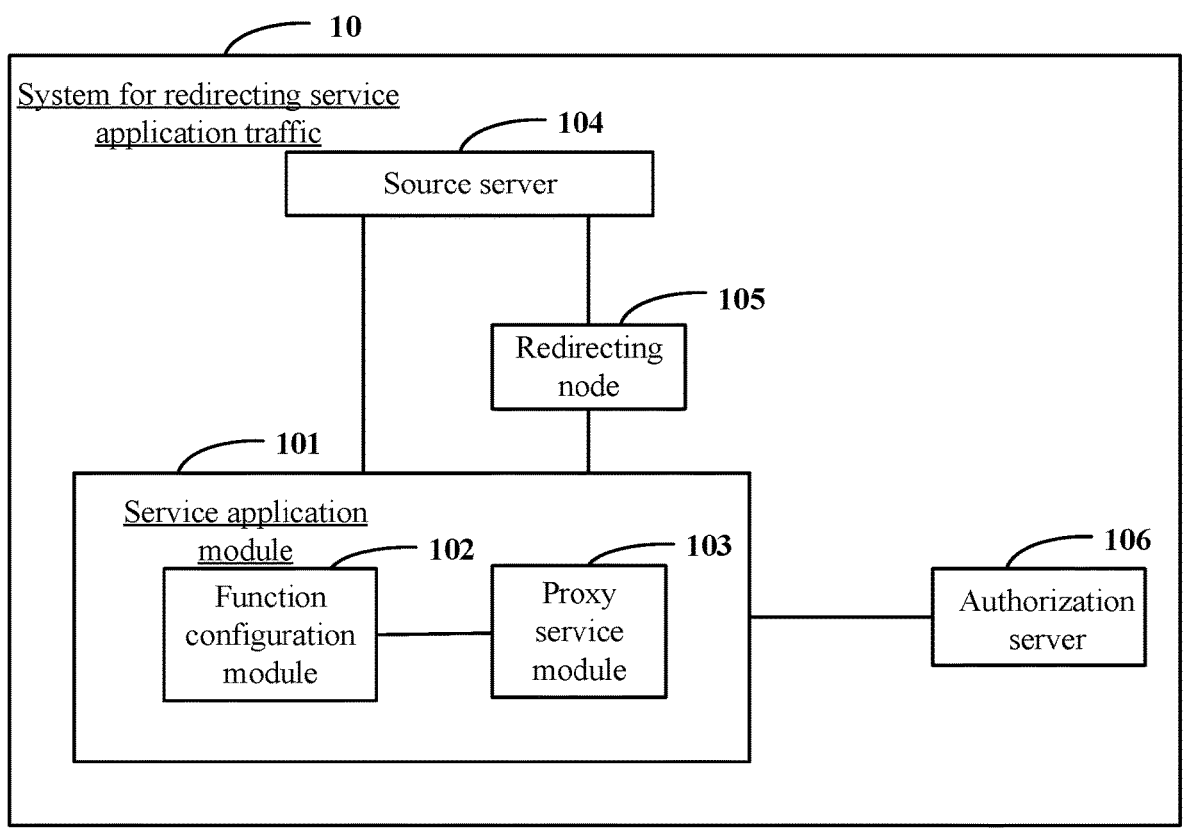
FIG. 3 illustrates a structural schematic view of a system 10 for redirecting service application traffic according to embodiments of the present disclosure.

Referring to FIG. 3, FIG. 3 illustrates a structural schematic view of a system for redirecting service application traffic according to embodiments of the present disclosure.

A system 10 for redirecting service application traffic specifically includes: a service application module 101, a function configuration module 102, and a proxy service module 103, a source server 104, a redirecting node 105, and an authorization server 106 installed and running at a same electronic device. In one implementation, the proxy service module 103 and the function configuration module 102 may be software development tool packets embedded in the service application module 101, and the electronic device may be a mobile communication device, such as a cellphone or a tablet.

The function configuration module 102 traverses dlopen function and connect function in all dynamic libraries initially loaded by the service application module 101, mounts the dlopen function and the connect function, and replaces the dlopen function and the connect function with a self-defined mydlopen function and a self-defined myconnect function, respectively.

In particular, the dlopen function is a strong library function, and common features of the function include opening a new library and storing the new library in a memory.

The connect function is also a common function, primarily configured to establish connections.

The mydlopen function is a self-defined function established for users. Other than maintaining the feature of the dlopen function that loads new dynamic libraries, the mydlopen function introduces a feature of mounting the dlopen function and the connect function, and replacing the dlopen function and the connect function with a self-defined mydlopen function and a self-defined myconnect function, respectively. As such, when the service application module loads a new dynamic library through the mydlopen function, the dlopen function and the connect function in the new dynamic library may be replaced with the mydlopen function and the myconnect function. Further, through an approach of recursion, the dlopen function and connect function in in all dynamic libraries loaded by the service application module are replaced with the mydlopen function and the myconnect function.

The myconnect function is also a self-defined function established by the users, and the features of the myconnect function include redirecting non-local traffic of the service application module to a proxy service module. Specifically, the features of the myconnect function include receiving traffic sent by the service application module, acquiring a destination IP address and a destination port of the traffic, and determining whether the destination IP address is a local IP address. If the destination IP address is the local IP address, the myconnect function sends the traffic to the destination port, and if the destination IP address is not the local IP address, the myconnect function sends the traffic to a port listened on by the proxy service module.

Further, the functions of myconnect function also include establishing a destination IP address, a destination port, and a connection port for acquiring the non-local traffic, and establishing and saving a mapping relationship between the destination IP address, the destination port and the connection port into a mapping relationship record. The mapping relationship is primarily subsequently when data is sent back to the service application module, which will be illustrated in detail hereinafter.

In the disclosed mobile app, when the app is started, the service application module performs initialization by applying an approach of mounting the redirecting service. That is, dlopen function and connect function in all dynamic libraries initially loaded by a service application module of the current mobile app are traversed, and all dlopen function and connect function associated with the dynamic libraries are replaced with a self-defined mydlopen function and a self-defined myconnect function, respectively.

During the use of the mobile app, the mydlopen function is applied to load a desired new dynamic library, and when the new library is loaded, the dlopen function and the connect function in the new library are replaced with the mydlopen function and the myconnect function, respectively. Similarly, when the new dynamic libraries load other libraries, the mydlopen function may be triggered, and the mydlopen function may be utilized to determine whether a newly loaded dynamic library includes the dlopen function and the connect function. If the newly loaded dynamic library includes the dlopen function and the connect function, the dlopen function and the connect function in the newly loaded dynamic library are replaced with the mydlopen function and the myconnect function, respectively. As such, through the aforementioned recursive approach, the connect function in all the dynamic libraries loaded by the service application module is replaced with the myconnect function. Through the myconnect function, the local traffic is sent to a local device, and the non-local traffic is sent to the proxy service module, such that traffic leakage is avoided.

The proxy service module 103 receives the non-local traffic sent by the myconnect function from the service application module 101, and directs the non-local traffic.

In one implementation, when started, the service application module 101 may request user information from the user. After receiving the user information, the user information may be sent to a remote authorization server 106, and the remote authorization server 106 determines a subscription state of the user based on the user information, and issues a corresponding traffic redirecting rule to the proxy service module 103. The traffic redirecting rule includes whether or not to perform traffic redirecting, information of the designated redirecting node, and data encryption key, etc. When the proxy service module 103 receives the issued traffic redirecting rule, the traffic redirecting rule is saved, and traffic redirecting is performed based on the traffic redirecting rule.

Because the process during which the remote authorization server 106 issues the traffic redirecting rule takes a certain period of time, to ensure the user experience, when starting the proxy service module 103, the traffic redirecting rule in the cache is loaded. If the traffic redirecting rule cannot be loaded from the cache, a default traffic redirecting rule is applied to direct the current traffic, thereby providing rapid response to the user request.

In one implementation, a method of using the proxy service module 103 to direct the non-local traffic includes:
  acquiring a traffic redirecting rule. Based on the aforementioned descriptions, acquiring the traffic redirecting rule includes: when starting the proxy service module 103, loading the traffic redirecting rule from a cache, and if the traffic redirecting rule cannot be loaded from the cache, applying a default traffic redirecting rule; issuing, by an authorization server 106, the traffic redirecting rule to the proxy service module 103 based on user information, and receiving, by the proxy service module 103, the traffic redirecting rule issued by the authorization server 106. That is, when the traffic redirecting rule issued by the authorization server 106 has not arrived at the proxy service module 103, to rapidly respond to the user request, the proxy service module 103 may first load the traffic redirecting rule in the local cache or may process the traffic based on the default traffic redirecting rule. After the proxy service module 103 receives the traffic redirecting rule issued by the authorization server 106, the proxy service module 103 may process the non-local traffic received from the service application module 101 based on the newly issued traffic redirecting rule.

After acquiring the traffic redirecting rule, the proxy service module 103 may, based on the traffic redirecting rule, process the non-local traffic. The processing approach may include: direct sending the non-local traffic back to the source station, or establishing a transmission path connecting the proxy service module 103, the redirecting node 105, and the source server 104. Through the transmission path, the non-local traffic is sent to the source server 104, and after acquiring the corresponding resource, the resource is sent back to the proxy service module 103 through the transmission path, and the resource is further sent to the service application module 101 by the proxy service module 103.

In one implementation, sending the non-local traffic directly back to the source station includes: acquiring, by the proxy service module 103, a destination IP and a destination port of the non-local traffic from the mapping relationship record, and sending the non-local traffic to a source server 104 corresponding to the destination IP and the destination port.

In one implementation, a method of establishing a transmission path connecting the proxy service module 103, the redirecting node 105 and the source server 104 includes: sending, by the proxy service module 103, a connection request to a redirecting node 104 designated in the traffic redirecting rule; after establishing a successful connection, sending a packet that includes information of the destination IP and the destination port of the non-local traffic to the redirecting node 104, parsing, by the redirecting node 104, the destination IP and the destination port from the packet, selecting, by the redirecting node, a source server 105 for establishing a connection, after connection is established, sending, by the proxy service module 103, the non-local traffic to the redirecting node 104 through the transmission path, where the non-local traffic arrives at the source server 105 to acquire requested resource.

In one implementation, the packet includes a verification value. When receiving the packet, the redirecting node 104 confirms whether a current connection is legal based on the verification value of the packet. If the current connection is legal, the redirecting node 104 selects the source server and connects with the source server. If the current connection is illegal, the user information is determined to be expired or invalid, the redirecting node 104 refuses to connect with the source server, and sends the information of connection failure back to the proxy service module 103.

In one implementation, a method of sending, by the proxy service module 103, the resource to the service application module 101 includes: after receiving the resource through the transmission path, acquiring, by the proxy service module 103, a connection port of the service application module 101 from the mapping relationship; sending, by the proxy service module 103, the resource to the connection port; and receiving, the service module 101, an access resource through the connection port.

In one implementation, the source server 105 is a content server, or a caching server in a CDN network.

In one implementation, the service application traffic is TCP traffic.

The present disclosure provides a method for redirecting service application traffic. Traffic of the service application module is directed through a function-replacing approach and local proxy, and a transmission path is established to improve the traffic transmission speed. Further, the user information is verified through a remote authorization server, and based on the subscription state and content of the current user, a corresponding traffic redirecting rule is issued. Thus, the smoothness degree of traffic redirecting in the directional data flow is greatly enhanced, to allow the user to have a relatively good experience. Further, the service demands for service provider to provide difference service experiences to different users are also satisfied.

The above-described device embodiments are for illustrative purposes, units described as separated components may or may not be physically separated, and the components displayed as units may or may not be physical units. Based on practical demands, partial or entire modules may be selected to implement the objective of the present disclosure. For those ordinarily skilled in the relevant art, the present disclosure may be understood and implemented without contributing creative labor.

Through the foregoing description of the implementation manners, it is clear to those skilled in the relevant art that the present disclosure may be implemented by software plus a necessary universal hardware platform, and certainly may also be implemented by hardware, but in many cases, the software implementation is preferred. Based on such an understanding, the technical solutions of the present disclosure or the part that makes contributions to the existing technology may be substantially embodied in the form of a software product. The software product may be stored in a computer-readable storage medium, such as ROM/RAM, magnetic disk, or optical disc, and includes a plurality of commands to instruct a computer device (which may be a personal computer, a server, or a network device) to perform the method according to each or some portions of embodiments of the present disclosure.

The foregoing is only preferred implementations of the present disclosure, which does not intend to limit the present disclosure. Without departing from the spirit of the present disclosure, any modification, equivalent replacement or improvement shall all fall within the protection scope of the present disclosure.

What is claimed is:

1. A method for redirecting a service application traffic performed by an electronic device, the method comprising:
   traversing dlopen function and connect function in all dynamic libraries initially loaded by a service application module;
   mounting the dlopen function and the connect function, and replacing the dlopen function and the connect function with a self-defined mydlopen function and a self-defined myconnect function, respectively, wherein:
      features of the mydlopen function include loading a new dynamic library, mounting the dlopen function and the connect function in the new dynamic library, and replacing the dlopen function and the connect function with the mydlopen function and the myconnect function, respectively, and features of the myconnect function include receiving traffic sent by the service application module, acquiring a destination IP address and a destination port of the traffic, determining whether the traffic is local traffic or non-local traffic by determining whether the destination IP address is a local IP address; if the destination IP address is the local IP address, the traffic being the local traffic and sending the local traffic to the destination port; and if the destination IP address is not the local IP address, the traffic being the non-local traffic and sending the non-local traffic to a port listened on by the proxy service module; and receiving, by the proxy service module, the non-local traffic, and redirecting, by the proxy service module, the non-local traffic, wherein the features of the myconnect function further include acquiring a destination IP address, a destination port, and a connection port of the non-local traffic, and establishing and saving a mapping relationship between the destination IP address, the destination port and the connection port into a mapping relationship record, and wherein redirecting, by the proxy service module, the non-local traffic includes:

acquiring a traffic redirecting rule; and based on the traffic redirecting rule, sending the non-local traffic back to a source station; or establishing a transmission path connecting the proxy service module, a redirecting node and a source server, and sending the non-local traffic to the source server through the transmission path; receiving a corresponding resource from the source server through the transmission path, and sending the resource to the service application module.

2. The method according to claim 1, wherein the acquiring of the traffic redirecting rule includes:

when starting the proxy service module, loading the traffic redirecting rule from a cache, and if the traffic redirecting rule cannot be loaded from the cache, applying a default traffic redirecting rule; and issuing, by an authorization server, the traffic redirecting rule to the proxy service module based on user information, and receiving, by the proxy service module, the traffic redirecting rule issued by the authorization server.

3. The method according to claim 1, wherein sending the non-local traffic back to the source station includes:

acquiring a destination IP and a destination port of the non-local traffic from the mapping relationship record, and sending the non-local traffic to a source server corresponding to the destination IP and the destination port.

4. The method according to claim 1, wherein establishing the transmission path connecting the proxy service module, the redirecting node and the source server comprises:

sending, by the proxy service module, a connection request to a redirecting node designated in the traffic redirecting rule; and after establishing a successful connection, sending a packet that includes information of the destination IP and the destination port of the non-local traffic to the redirecting node, parsing, by the redirecting node, the destination IP and the destination port from the packet, selecting, by the redirecting node, a source server for establishing a connection, after the connection is established, sending, by the proxy service module, the non-local traffic to the redirecting node through the transmission path, such that the non-local traffic arrives at the source server to acquire requested resource.

5. The method according to claim 4, wherein the packet includes a verification value, wherein the redirecting node confirms whether a current connection is legal based on the verification value, and if the current connection is legal, the redirecting node selects and connects with the source server.

6. The method according to claim 1, wherein sending, by the proxy service module, the resource to the service application module includes:

after receiving the resource, acquiring, by the proxy service module, a connection port of the service application module based on the mapping relationship record, and sending, by the proxy service module, the resource to the connection port.

7. A system for redirecting service application traffic, comprising:

a service application module, a function configuration module, and a proxy service module, installed and running at a same electronic device, wherein:

the function configuration module traverses dlopen function and connect function in all dynamic libraries initially loaded by the service application module, mounts the dlopen function and the connect function, and replaces the dlopen function and the connect function with a self-defined mydlopen function and a self-defined myconnect function, respectively, wherein:

features of the mydlopen function include loading a new dynamic library, mounting the dlopen function and the connect function in the new dynamic library, and replacing the dlopen function and the connect function with the mydlopen function and the myconnect function, and features of the myconnect function include receiving traffic sent by the service application module, acquiring a destination IP address and a destination port of the traffic, determining whether the traffic is local traffic or non-local traffic by determining whether destination IP address is a local IP address; if the destination IP address is the local IP address, the traffic being the local traffic and sending the local traffic to the destination port; and if the destination IP address is not the local IP address, the traffic being the non-local traffic and sending the non-local traffic to a port listened on by the proxy service module, and wherein the proxy service module receives the non-local traffic and directs the non-local traffic, wherein the features of the myconnect function further include acquiring a destination IP address, a destination port, and a connection port of the non-local traffic, and establishing and saving a mapping relationship between the destination IP address, the destination port and the connection port into a mapping relationship record, and wherein the proxy service module is configured to acquire a traffic redirecting rule; and based on the traffic redirecting rule, send the non-local traffic back to a source station; or establish a transmission path connecting the proxy service module, a redirecting node and a source server, and send the non-local traffic to the source server through the transmission path; receive a corresponding resource from the source server through the transmission path, and send the resource to the service application module.

8. The system according to claim 7, further including an authorization server, wherein the proxy service module is further configured to:

when starting the proxy service module, load the traffic redirecting rule from a cache, and if the traffic redirecting rule cannot be loaded from the cache, apply a default traffic redirecting rule; and receive the traffic redirecting rule issued by the authorization server based on user information.

9. The system according to claim 7, wherein the proxy service module is further configured to: acquire a destination IP and a destination port of the non-local traffic from the mapping relationship record, and send the non-local traffic to a source server corresponding to the destination IP and the destination port.

10. The system according to claim 7, wherein the proxy service module is further configured to:

send, a connection request to a redirecting node designated in the traffic redirecting rule; and after establishing a successful connection, send a packet that includes information of the destination IP and the destination port of the non-local traffic to the redirecting node, after the connection is established for a source server selected according to the destination IP and the destination port parsed from the packet by the redirecting node, send the non-local traffic to the redirecting node through the transmission path, such that the non-local traffic arrives at the source server to acquire requested resource.

11. The system according to claim 10, wherein the packet includes a verification value, wherein the redirecting node confirms whether a current connection is legal based on the verification value, and if the current connection is legal, the redirecting node selects and connects with the source server.

12. The system according to claim 7, wherein the proxy service module sends the resource to the service application module by a method including:

after receiving the resource, acquiring, by the proxy service module, a connection port of the service application module based on the mapping relationship record, and sending, by the proxy service module, the resource to the connection port.

13. The system according to claim 7, wherein the proxy service module and the function configuration module are software development tool packets embedded in the service application module.

14. The system according to claim 7, wherein the electronic device is a mobile communication device.

* * * * *